Figure 1:
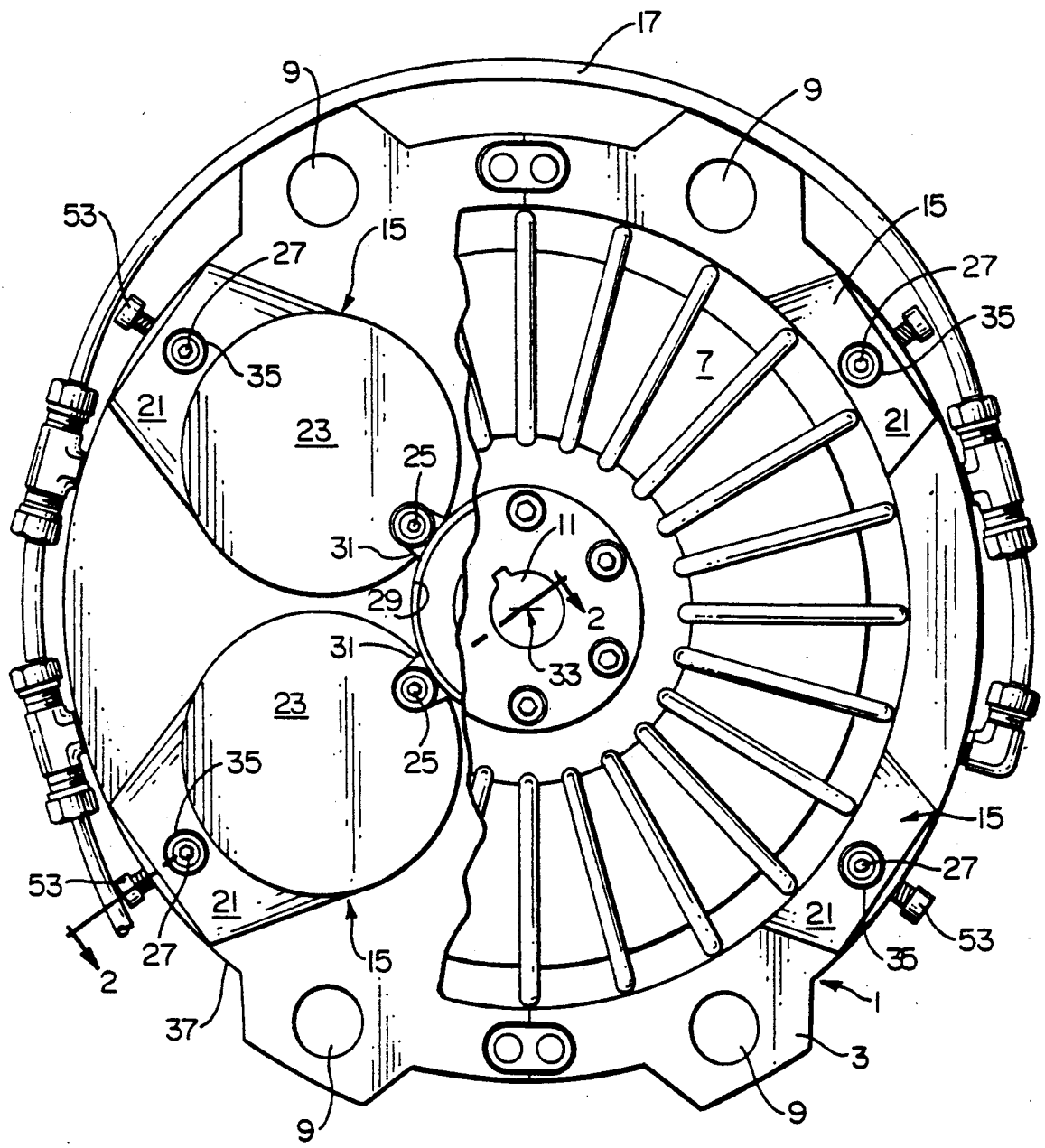

United States Patent [19]

Ekola

[11] Patent Number: 5,052,525
[45] Date of Patent: Oct. 1, 1991

[54] QUICK RELEASE TORQUE POST ASSEMBLY FOR WEB TENSION BRAKE PADS

[76] Inventor: Kenneth E. Ekola, 574-6th St., Dover, N.H. 03820

[21] Appl. No.: 405,951

[22] Filed: Sep. 12, 1989

[51] Int. Cl.⁵ .............................................. F16D 55/10
[52] U.S. Cl. ................................ 188/73.32; 188/71.3; 192/70; 192/70.13; 403/328
[58] Field of Search ................... 188/73.32, 71.3, 71.4, 188/244, 245; 403/328; 192/70.13, 70

[56] References Cited

U.S. PATENT DOCUMENTS

| | | | |
|---|---|---|---|
| 713,794 | 11/1902 | Ostermann | 403/328 X |
| 2,861,654 | 11/1958 | Dean | 188/73.32 X |
| 3,027,978 | 4/1962 | Peras | 188/73.32 X |
| 3,561,572 | 2/1971 | Flegl et al. | 188/73.32 |
| 4,232,764 | 11/1980 | Yamamoto | 188/73.32 |
| 4,371,061 | 2/1983 | Ottewell | 188/244 |
| 4,508,468 | 4/1985 | Irwin | 403/328 |
| 4,518,002 | 5/1985 | Battiston, Sr. et al. | 403/328 X |
| 4,535,873 | 8/1985 | Airheart | 188/73.32 X |
| 4,613,021 | 9/1986 | LaCombe et al. | 192/70.13 X |
| 4,860,865 | 8/1989 | Montalvo, III et al. | 188/73.32 X |

FOREIGN PATENT DOCUMENTS

| | | | |
|---|---|---|---|
| 2505877 | 8/1926 | Fed. Rep. of Germany | 188/73.36 |
| 3543511 | 6/1987 | Fed. Rep. of Germany | 188/73.32 |

*Primary Examiner*—George E. A. Halvosa
*Attorney, Agent, or Firm*—Davis, Bujold & Streck

[57] ABSTRACT

A tension brake or clutch having a quick release torque post providing in a first position, to which it is resiliently biased, torque transmission between a brake or clutch pad and an actuator plate and providing in a second position, to which the post is easily and quickly slid against the resilient bias, disengagement from the brake pad to permit the pad's quick and easy removal and replacement. A latch pin is optionally provided to latch the torque post in the disengaged position.

11 Claims, 2 Drawing Sheets

QUICK RELEASE TORQUE POST ASSEMBLY FOR WEB TENSION BRAKE PADS

This invention relates to a quick release torque post assembly particularly, though not exclusively, for brake pads of tension brakes or clutches, such as those used to control the web tension in paper handling machinery.

In one design of tension brake in the prior art, torque posts bolted to the tension brake's actuator plate have been utilized to locate the brake pads utilized therein. In these designs, when pad maintenance or replacement is required, it has been necessary to at least partly disassemble the tension brake in order to gain access to the torque posts to permit removal of the brake pads. This disassembly requires the removal of at least a portion of the actuator plate from the tension brake, which disturbs the alignment of the actuator plate with the other parts of the brake, and results in significant downtime for the associated machinery as a result of the time-consuming nature of the operation required.

In another prior art design of tension brake, the torque post adjacent the periphery of the actuator plate is a flat plate bolted to the periphery of the actuator plate and extending to engage a slot in the back plate of the brake pad. Orientation of this torque post is assured by a groove machined in the periphery of the actuator plate. While this design is an improvement over the aforementioned design of the prior art, there are significant inconveniences in terms of the time needed for replacement of the pads, the need for the use of tools in this exercise and the real possibility in a manufacturing environment, of the loss of the torque posts during the maintenance procedure.

It is an object of the present invention to provide a torque post assembly which allows the replacement of brake pads in a web tension brake without the need for removal of any component from the tension brake, except the brake pads themselves, and without the need for the use of any tools while at the same time allowing the replacement brake pads a significantly shorter time than has been previously possible in such brakes.

According to the invention, there is provided a friction torque transmitting device for controlling the tension of a web comprising a friction pad disposed between relatively rotatable first and second means and moveable by said first means into frictional engagement with said second means to resist relative rotation between said first and second means, said friction pad being supported relative to said first means by a quick release torque post assembly captively mounted on said first means, said torque post being resiliently biased into torque transmitting engagement with said friction pad and being moveable against said resilient bias to a position disengaged from said friction pad to facilitate removal of that pad from the device.

Figure 2:
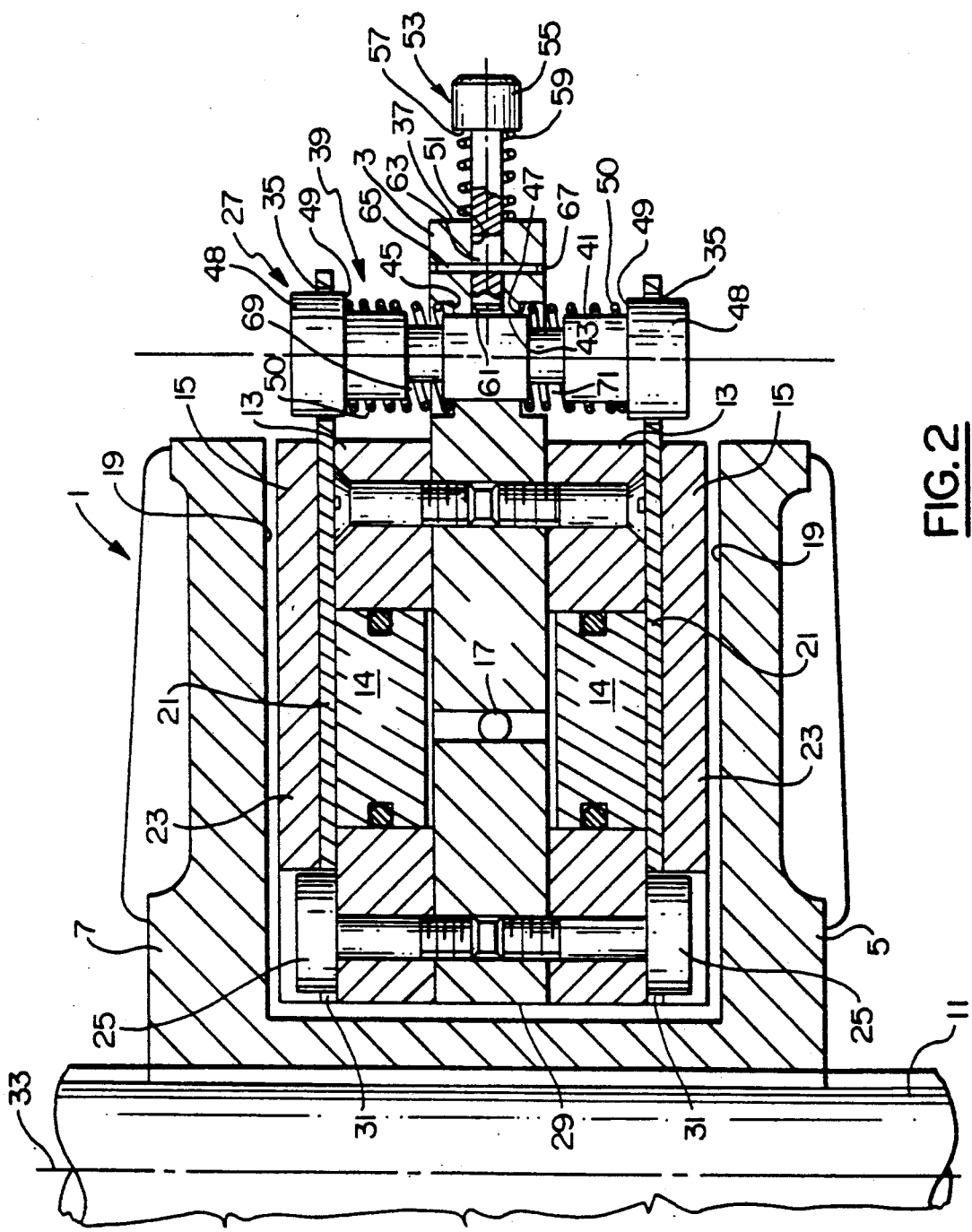

The invention will now be described, by way of example, with reference to the accompanying drawings, in which:

FIG. 1 is a partially cutaway view along the axis of a tension brake utilizing a quick release torque post assembly of the present invention; and FIG. 2 is a fragmentary partial cross-section on section line 2—2 of FIG. 1.

While this invention is described with reference to a tension brake, it will be appreciated that the torque post assembly of the present invention could readily be utilized in a clutch arrangement having disc brake pads similar to those of the tension brake described and that such a use falls within the scope of the present invention.

With reference the drawings, a tension brake 1 comprises an actuator plate 3 disposed between inner and outer discs 5 and 7 (disc 7 being seen only in FIG. 1). Actuator plate 3 is held stationary and positioned by mounting holes 9 by which the plate may be bolted to a support structure (not shown) for the tension brake The inner and outer discs 5 and 7 are fixedly attached, by a key or splines, to a rotatable shaft 11 by which the braking torque is transmitted to the web (not shown) to be tensioned.

The actuator plate 3 carries opposed pairs of air or hydraulic actuators 13 (see FIG. 2) on the pistons of which are supported brake pads 15 which may, under air or hydraulic pressure supplied to the actuators through supply conduit 17, be moved into contact with the annular disc friction surfaces 19 of the inner and outer discs 5 and 7 The brake pads 15 comprise a back plate 21 and a friction pad 23 is fixedly attached thereto. The back plates 21 are in contact with the pistons 14 of the actuators 13 while the pads 23 are positioned to engage the friction surfaces 19 when the brake is actuated.

Each back plate 21 is located by two torque posts 25 and 27 by which braking torque is transmitted from the actuator plate to the outer discs 5 and 7, while movement of the pads 23 into engagement with the friction surfaces 19 is freely permitted. Torque post 25 is located radially relatively closer to the central opening 29 of the actuator plate 3 and is fixed relative to the actuator plate. This torque post 25 is engaged by an open ended slot 31 in the back plate 21 which permits the brake pad 15 to be moved freely radially outwardly from the axis 33 of the shaft 11 while transmitting the braking torque as mentioned above. That radial movement of the brake pad 15 is prevented by the torque post 27 when in engagement with opening 35 of the back plate 21. The torque post 27 is located in radial alignment with the torque post 25 and close to the outer periphery 37 of the actuator plate 3

Each torque post 27 forms a part of the quick release torque post assembly 39. Each quick release torque post assembly 39 has the following construction. A cylindrical member 41 is mounted for sliding axial motion through a bore 43 in the actuator plate 3. Counterbores 45 and 47 are formed one at each end of the bore 43. To each end of the cylindrical member 41 is rigidly attached a torque post head 48. The torque post heads 48 are larger in diameter than the cylindrical member 41 each thereby presenting an annular face 49 to the associated counterbore 45 or 47. Between the annular face 49 of each torque post head 48 and the associated counterbore 45 or 47 is located a coil spring 50 under sufficient compression to bias the cylindrical member 41 to a central position axially of the bore 43.

Extending radially outwardly from the axis of the bore 43 and centrally located in that bore 43 is a latch pin locating bore 51 which extends to the periphery 37 of the actuator plate 3. Slidably mounted in bore 51 is a latch pin 53. The latch pin 53 has an enlarged cylindrical head 55 defining an annular surface 57 facing the periphery 37. A coil spring 59 is located about the latch pin between the face 57 and the periphery 37 to bias the latch pin outwardly from the bore 51 to a position as shown in FIG. 2, in which the end 61 of the latch pin 53 is closely adjacent but not in contact with the cylindrical member 41. The latch pin 53 has a slot 63 extending therethrough which is elongate axially of the latch pin and through which extends a locating pin 65 to limit the axial movement of the latch pin 53. The locating pin 65 is located with an interference fit in a bore 67 extending transversely through the axis of the bore 51 whereby the latch pin is held captive within the bore 51 by the locating pin 65 while being permitted to move from the position shown in FIG. 2 to a position against the bias of spring 59 in which the end 61 can engage one of two annular grooves 69 and 71 formed in the cylindrical member on either side of a central portion, of that cylindrical member, which is slidingly supported in the bore 43. The bias of the spring 59 is sufficient to maintain the latch pin in the position shown in FIG. 2 except when the end 61 is engaged in one of the grooves 69 or 71 with the associated spring 50 applying an axial force to the cylindrical member 41 to force the side of the latch pin 53 adjacent the end 61 against a side wall of the groove 69 or 71 concerned. Under these circumstances, the compressive force applied by the spring 50 is chosen to be sufficient to cause sufficient friction to prevent the biasing force of the spring 59 from moving the latch pin to the position shown in FIG. 2.

When it is desired to remove a brake pad 15 from the tension brake 1, axial pressure is applied to the associated torque post 27 to move the cylindrical member 41 axially through the bore 43 against the bias of the spring 50 associated with that torque post 27 to bring the relevant groove 69 or 71, which is of rectangular crosssection, into alignment with the bore 51 so that the associated latch pin 53 can be moved axially to bring end 61 into that groove whereby release of the pressure of the torque post 27 will allow the associated spring 50 to bring the cylindrical surface of the latch pin 53 adjacent the end 61 into frictional engagement with a side of that groove, thereby to latch the cylindrical member 41 in a position in which the torque post 27 is axially removed from the opening 35 of the back plate 21 of the brake pad 15 to be removed. That back plate can then be removed by sliding it axially of the tension brake to disengage it from the associated torque post 25 without disturbing the structural integrity of the tension brake itself. The pad can then be replaced as desired with the associated torque post 27 being allowed to return to its position in engagement with the opening 35 under the influence of the associated spring 50 by withdrawal of the latch pin from its engagement with the associated groove 69 or 71. This can be achieved by pulling the latch pin radially outwardly away from the bore 43 or by pressing the associated torque post 27 axially to release the frictional engagement between the latch pin and the groove concerned thereby allowing the spring 59 to act to move the latch pin to its disengaged position.

It will be appreciated that dimensions and proportions of the components are chosen to allow the torque post 27 to engage the opening 35 for the transmission of braking torque when the cylindrical member 41 is in its central position in the bore 43 while insuring that the torque post 27 is free of the opening 35 when the groove 69 or 71 associated with that torque post 27 is latched in the retracted position of that torque post 27 by the latch pin 53. The counterbores 45 and 47 assist in insuring that there is sufficient range of compression movement of the associated spring 50 to permit the necessary amount of retraction of the torque post 27 to achieve this design end.

I claim:

1. A friction torque transmitting device in the form of a tension brake for controlling the tension of a web comprising a friction pad disposed between relatively rotatable first and second means and moveable by said first means into frictional engagement with said second means to resist relative rotation between and first and second means, said friction pad being supported relative to said first means by a quick release torque post captively mounted on said first means for axial movement relative thereto, said torque post being resiliently biased into torque transmitting engagement with said friction pad and said torque post being moveable against said resilient bias to a position disengaged from said friction pad to facilitate removal of that pad from the device;

wherein said first means is an actuator plate carrying at least one friction pad supporting actuator, said second means is a rotatable disc defining an annular disc surface for said engagement by a said friction pad supported by said actuator, and said torque post is captively mounted for axial movement in a bore defined by said actuator plate with the resilient bias being provided by a coil spring disposed between said actuator plate and a friction pad engaging head of the torque post, and said second means defines two facing parallel annular disc surfaces with said actuator plate disposed therebetween, said actuator plate having opposed faces, one facing each disc surface, each carrying at least one said actuator and a said friction pad supported and moveable thereby into engagement with the adjacent facing disc surface, said torque post extending through said bore between torque post ends, having a said head at each said end with a said coil spring between each said head and said actuator plate to bias said torque post to a central position in said bore in which said torque post is in said torque transmitting engagement with both said friction pads.

2. A device according to claim 1 wherein a cylindrical portion of said torque post is slidingly engaged in said bore and said coil spring is disposed about said torque post to provide said bias, and said head engages an opening in said friction pad to provide said torque transmission while permitting movement of said friction pad into and out of said engagement with said second means.

3. A friction torque transmitting device for controlling the tension of a web comprising a friction pad disposed between relatively rotatable first and second means and moveable by said first means into frictional engagement with said second means to resist relative rotation between said first and second means, said first means including a latch means mounted thereto, said latch means moveable between first and second positions in the first of which a latch pin is free of a quick release torque post and in the second of which the latch pin engages said torque post to latch said torque post in a position in which it is disengaged from the friction pad, said friction pad being supported relative to said first means by said torque post captively mounted on said first means, said torque post being resiliently biased into torque transmitting engagement with said friction pad and being moveable against said resilient bias to a position disengaged from said friction pad to facilitate removal of that pad from the device.

4. A device according to claim 3 in which the latch means is resiliently biased to said first position, said bias being insufficient to itself unlatch the latch pin from torque post when latched thereby.

5. A device according to claim 4 wherein said latching results from a frictional engagement of the latch pin with the torque post provided by said coil spring.

6. A device according to claim 3 in the form of a tension brake in which said first means is an actuator plate carrying at least one friction pad supporting actuator, said second means is a rotatable disc defining an annular disc surface for said engagement by a said friction pad supported by said actuator, and said torque post is captively mounted for axial movement in a bore defined by said actuator plate with the resilient bias being provided by a coil spring disposed between said actuator plate and a friction pad engaging head of the torque post.

7. A device according to claim 6 in which the latch means is resiliently biased to said first position, said bias being insufficient to itself unlatch the latch pin from torque post when latched thereby.

8. A device according to claim 7 wherein said latching results from a frictional engagement of the latch pin with the torque post provided by said coil spring.

9. A tension brake according to claim 6 wherein said second means defines two facing parallel annular disc surfaces with said actuator plate disposed therebetween, said actuator plate having opposed faces, one facing each disc surface, each carrying at least one said actuator and a said friction pad supported and moveable thereby into engagement with the adjacent facing disc surface, said torque post extending through said bore between torque post ends, having a said head at each said end with a said coil spring between each said head and said actuator plate to bias said torque post to a central position in said bore in which the torque post is in said torque transmitting engagement with both said friction pads.

10. A tension brake according to claim 6 wherein said friction pad comprises a back plate, engaged by said actuator and said quick release torque post, and a pad of friction material, fixedly attached thereto, to engage said annular disc surface, said back plate having an opening for torque transmitting engagement with said head.

11. A tension brake according to claim 10 wherein said friction pad is also located, for torque transmitting support by said actuator plate, by a fixed, relative to said actuator plate, torque post engaged in an open ended slot in said back plate oriented to provide said torque transmission while permitting said friction pad to be moved laterally out of engagement with said fixed torque post when said quick release torque post is disengaged from said back plate.

* * * * *